United States Patent [19]

Nakagawa et al.

[11] Patent Number: 5,144,295
[45] Date of Patent: Sep. 1, 1992

[54] INTERRUPTION PROCESSING SYSTEM IN TIME DIVISION MULTIPLEX TRANSMISSION SYSTEM

[75] Inventors: Yuji Nakagawa; Satoru Suzaki; Motoharu Terada, all of Kadoma, Japan

[73] Assignee: Matsushita Electric Works, Ltd., Osaka, Japan

[21] Appl. No.: 570,606

[22] Filed: Aug. 21, 1990

[30] Foreign Application Priority Data

Sep. 14, 1989 [JP] Japan .................... 1-239090
Mar. 15, 1990 [JP] Japan .................... 2-65010

[51] Int. Cl.$^5$ .............................. H04Q 9/00
[52] U.S. Cl. .................. 340/825.12; 340/825.6; 340/505; 370/110.4
[58] Field of Search ........... 340/825.6, 825.62, 825.63, 340/825.06, 825.09, 825.1, 825.12, 825.07, 825.08, 825.15, 825.13, 825.5, 825.57, 505, 506, 518, 310 R; 364/200 MS File, 900 MS File; 307/38, 40; 370/110.4, 111

[56] References Cited

U.S. PATENT DOCUMENTS

| | | | |
|---|---|---|---|
| 3,444,521 | 5/1969 | Breese | 340/825.13 |
| 4,311,986 | 1/1982 | Yee | 340/825.63 |
| 4,586,040 | 4/1986 | Akiba et al. | |
| 4,610,012 | 9/1986 | Terada et al. | 370/110.4 |
| 4,677,644 | 6/1987 | Lacroix et al. | 340/825.62 |
| 4,706,245 | 11/1987 | Suzuki et al. | 370/110.4 |
| 4,740,787 | 4/1988 | Kimura | 340/825.12 |

FOREIGN PATENT DOCUMENTS 59-117629 7/1984 Japan ................. 340/825.12

Primary Examiner—Donald J. Yusko
Assistant Examiner—John Giust
Attorney, Agent, or Firm—Burns, Doane, Swecker & Mathis

[57] ABSTRACT

An interruption processing system in time division multiplex transmission system executes at a central control unit a group access for accessing in batch respective groups of a plurality of terminal units in response to at least part of superior bits of a specific address for one of the terminal units which requests an interruption, causes inferior bits of the address returned from the terminal unit requesting the interruption to the central unit, and allows the central control unit to specify the interruption requesting terminal unit on the basis of the superior and inferior bits of the address. Extremely rapid specification of the interruption requesting terminal unit is thereby made achievable, and the operational response time of the transmission system can be shortened to a remarkable extent.

16 Claims, 6 Drawing Sheets

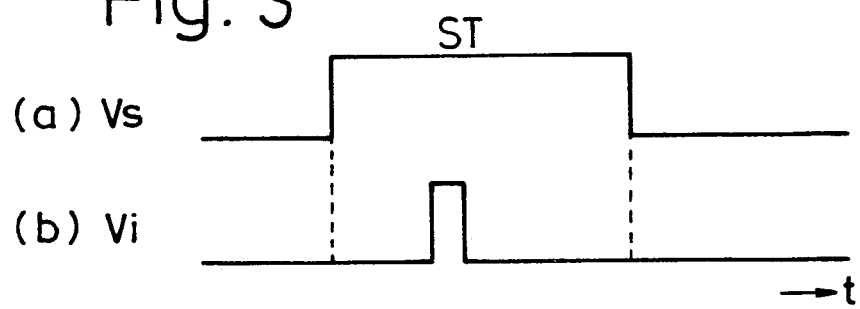
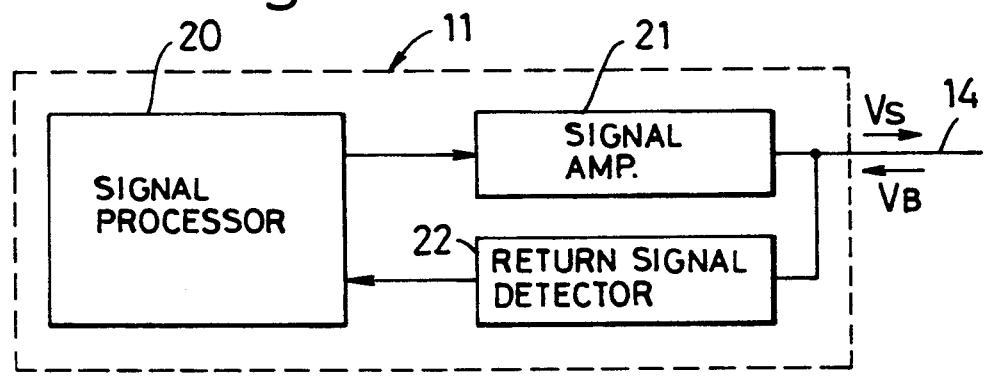
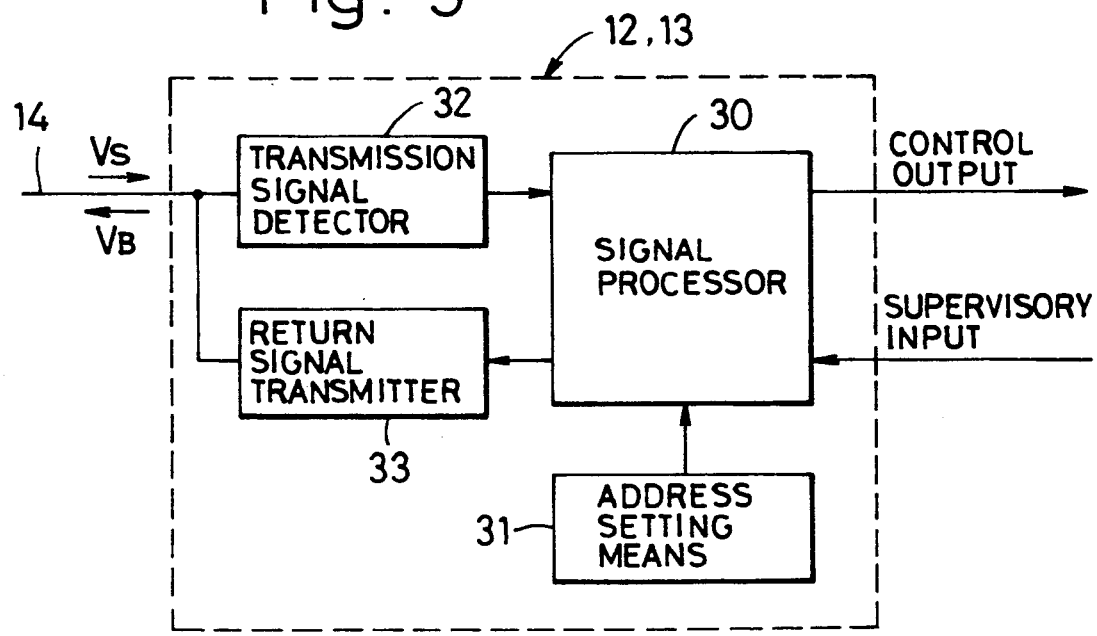

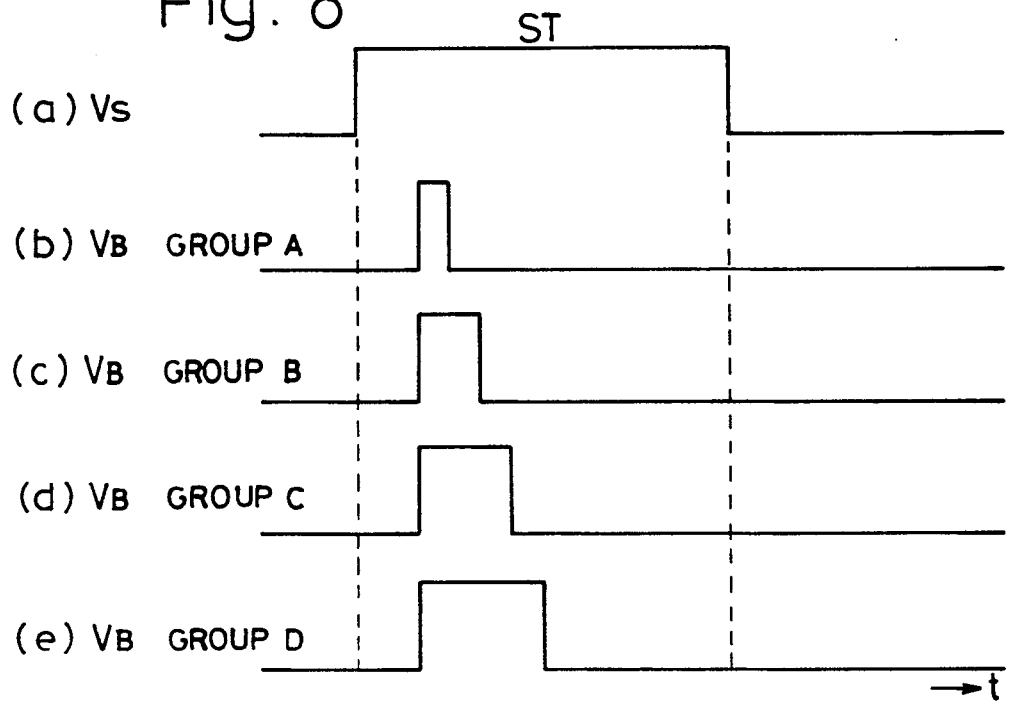
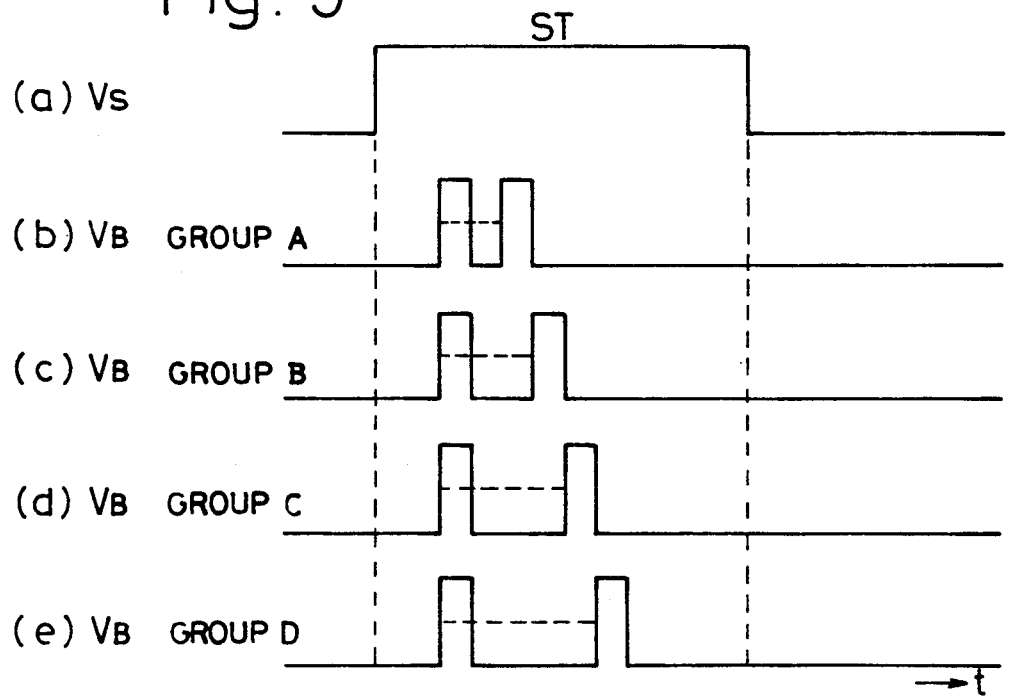

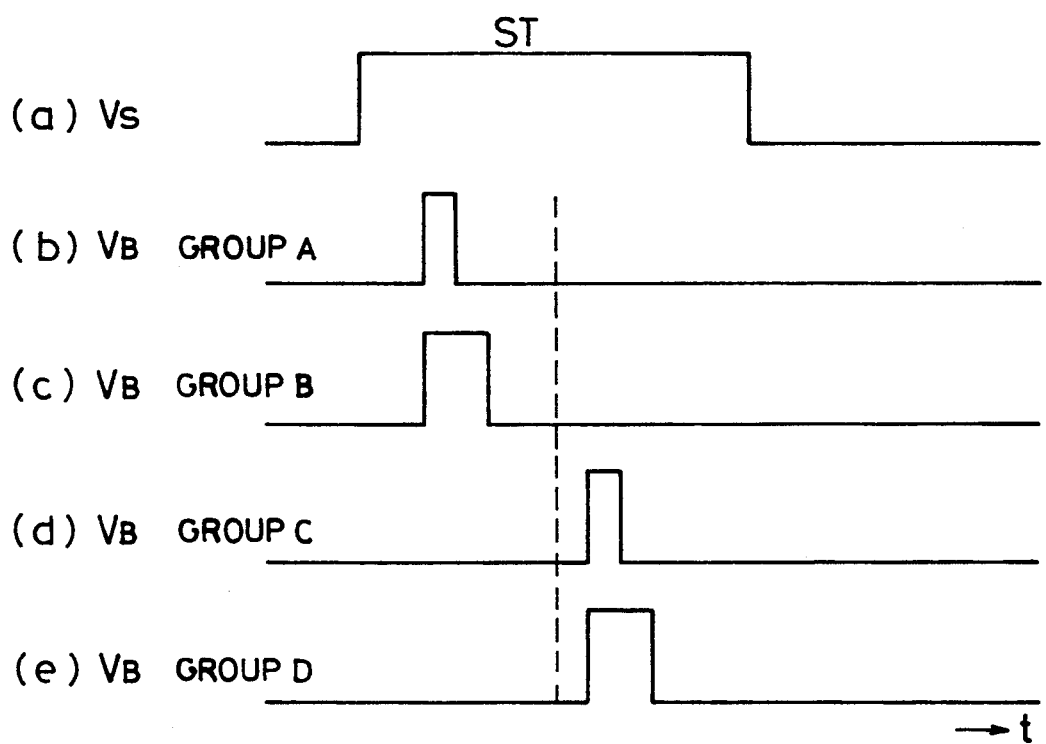

Fig. 11a

| ST | MD | AD | CD | CS | WT | EN |
|---|---|---|---|---|---|---|
| START PULSE | MODE DATA | ADDRESS DATA | CONTROL DATA | CHECK SUM DATA | RET. SIG. PERIOD | END PULSE |

↑ VVs   ↑ FVs

Fig. 11b

| ST | MD | AD | CC | CD | CS | WT |
|---|---|---|---|---|---|---|
| START PULSE | MODE DATA | ADDRESS DATA | VARIABLE LENGTH CODE | CONTROL DATA | CHECK SUM DATA | RET. SIG. PERIOD |

↑ VVs

INTERRUPTION PROCESSING SYSTEM IN TIME DIVISION MULTIPLEX TRANSMISSION SYSTEM

BACKGROUND OF THE INVENTION

This invention relates to an interruption processing system in time division multiplex transmission system and, more particularly, to a system for processing an interruption within a system in which signals are transmitted in time division multiplex manner through signal transmission medium between a central control unit and a plurality of terminal units.

The time division multiplex transmission system of the kind referred to is effectively applicable to remote monitoring and controlling of illumination control, regional security and the like systems.

DESCRIPTION OF RELATED ART

There have been suggested various remote monitoring and controlling systems employing the time division multiplex transmission system, such one of which as has been disclosed in U.S. Pat. No. 4,586,040 to Osamu Akiba et al, which is hereby incorporated by reference, comprises a central control unit, a plurality of monitoring terminal units respectively monitoring each of operation switches and a plurality of controlling terminal units respectively controlling each of loads, the respective terminal units being connected through a pair of signal lines to the central units so that predetermined transmission signals are transmitted from the central control unit through the signal lines to the terminal units. In this instance, a specific address is set for each of the terminal units while the transmission signals contain address data so that, when the address data of one of the terminal units coincide with the address data contained in the transmission signal from the central control unit, the particular terminal unit takes up control data also contained in the transmission signal and returns monitored data at the terminal unit as a current mode signal to the central unit in synchronism with a response stand-by signal further contained in the transmission signal.

Further, the foregoing central control unit is provided with an interruption processing means for detecting through an interruption processing the monitored data from the terminal unit, and is so arranged that a dummy transmission signal with mode data made as dummy mode is constantly transmitted so that, when an interruption signal is transmitted from one of the terminal units in synchronism with a start pulse included in the transmission signal therefrom, this terminal unit which has requested the interruption is searched for to be specified and an access to the interruption requesting terminal unit thus specified is made by a transmission signal of an individual access mode, to have the monitored data returned from this terminal unit to the central control unit as a transmission signal of the current mode.

In the remote monitoring and controlling system employing the foregoing time division multiplex transmission system and its interruption processing system, it will be possible to search for the interruption requesting terminal unit to exactly specify the same so as to effectively transmit required control data to the particular terminal unit. However, in searching such terminal unit, the arrangement is so made that, in the concrete, a transmission signal in which address data for a group access formed by sequentially varying superior bits of the address data is transmitted, and sequential access to every group of all the terminal units is carried out to have inferior bits of the address data returned from the interruption requesting terminal unit. Consequently, there has been a problem that the entire groups of the terminal units have to be subjected to the access in the event where the interruption request has been made by one of the terminal units which are forming the last stage group and a required longer time for specifying the interruption requesting terminal unit renders the operational response time of the entire system to be prolonged relatively remarkably.

SUMMARY OF THE INVENTION

A primary object of the present invention is, therefore, to provide an interruption processing system in time division multiplex transmission system which is capable of attaining an extremely rapid specification of the interruption requesting terminal unit, with the foregoing problem eliminated, and thus shortening to a remarkable extent the operational response time of the system.

According to the present invention, this object can be realized by an interruption processing system in time division multiplex transmission system in which a plurality of terminal units each having a specific address set therefor are connected through a pair of signal lines to a central control unit so that a time division multiplex data transmission can be attained between the central control unit and the terminal units by means of transmission signals transmitted from the central control unit and one of the terminal units, an access is properly carried out with respect to the terminal units for specifying one of the units which has requested an interruption, and this interruption requesting terminal unit thus specified is subjected to an access by means of one of the transmission signals of an individual access mode to have the data of the interruption requesting terminal unit returned therefrom to the central control unit as the transmission signal, characterized in that an interruption request is carried out by causing an interruption requesting signal which specifies at least part of superior bits of the specific address to be returned from the terminal unit to the central control unit in synchronism with a start pulse of the transmission signal, the central control unit executes upon receipt of at least part of the superior bits a group access to which the plurality of the terminal units are subjected in batch with the superior bits based on their bit data, the interruption requesting terminal unit returns inferior bits of the specific address to the central control unit upon the access to the group in which the interruption requesting terminal unit is included, the central control unit which has received the inferior bits from the interruption requesting terminal unit specifies the particular interruption requesting terminal unit on the basis of the inferior bits as well as the superior bits for the group access, and the interruption requesting terminal unit thus specified is then subjected to an individual access of the central control unit to carry out a signal transmission between the interruption requesting terminal unit and the central control unit.

Other objects and advantages of the present invention shall be made clear in following description of the invention detailed with reference to certain preferred embodiments of the invention shown in accompanying drawings.

BRIEF DESCRIPTION OF THE DRAWINGS

FIG. 3 is a wave form diagram for explaining the manner in which the interruption request is carried out in the system of FIG. 1;

FIG. 4 is a block circuit diagram of the central control unit in the system of FIG. 1;

FIG. 5 is a block circuit diagram of one of the terminal units in the system of FIG. 1;

FIG. 8 is a wave form diagram for explaining the manner in which a part of bits is specified by the interruption requesting signal in another embodiment of the present invention;

FIG. 9 is a wave form diagram for explaining the manner in which a part of bits is specified by the interruption requesting signal in still another embodiment of the present invention;

FIG. 10 is a wave form diagram for explaining the manner in which a part of bits is specified by the interruption requesting signal in a further embodiment into which the specifying manners of FIGS. 7 and 8 are combined; and FIGS. 11a and 11b are diagrams showing formats of the transmission signals in a still further embodiment of the present invention.

While the present invention shall now be described with reference to the respective embodiments shown in the accompanying drawings, it should be appreciated that the intention is not to limit the invention only to the embodiments shown but is to rather include all modifications, alterations and equivalent arrangements possible within the scope of appended claims.

DETAILED DESCRIPTION OF THE PREFERRED EMBODIMENTS

Figure 1:
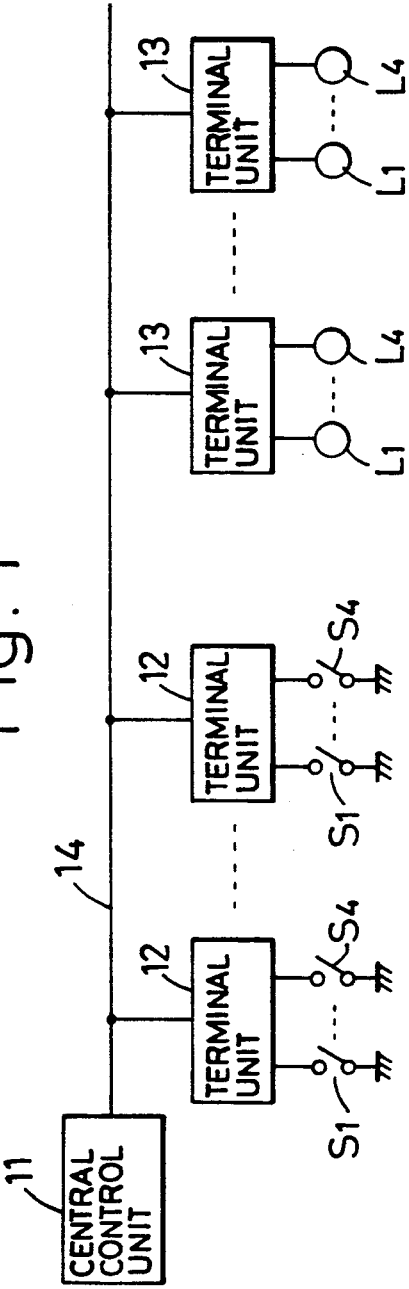
FIG. 1 is a diagram showing schematically the arrangement of a remote monitoring and controlling system in which the interruption processing system in time division multiplex transmission system according to the present invention is employed.

For the purpose of easier understanding of the interruption processing system in the time division multiplex transmission system according to the present invention, references shall be made first with reference to a remote monitoring and controlling system alone as an example of the time division multiplex transmission system. As shown in FIG. 1, the remote monitoring and controlling system comprises a central control unit 11, a plurality of monitoring terminal units 12 respectively for operating switches S1 to S4, and a plurality of controlling terminal units 13 respectively for loads L1 to L4, all the terminal units 12 and 13 being connected through a pair of signal lines 14 to the central control unit 11, and a specific address is set for each of the monitoring and controlling terminal units 12 and 13.

Figure 2:
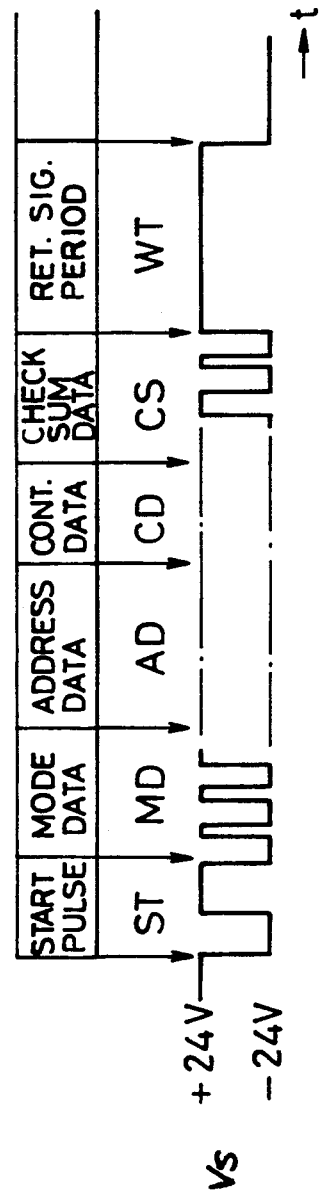
FIG. 2 is a diagram showing a format of the transmission signal for explaining the operation of the system of FIG. 1.

In the present instance, such transmission signal Vs as shown in FIG. 2 is transmitted from the central control unit 11 through the signal lines 14 to the respective terminal units 12 and 13, and the transmission signal Vs consists of a start pulse ST, mode data MD denoting the data transmission mode, address data AD denoting 8 bit address of the respective terminal units 12 and 13 subjected to the access, control data CD for controlling the loads L1-L4, such error detecting data CS as checksum data, and return-wait signal WT for setting a period in which monitored data are returned from the terminal units 12 and 13 to the central control unit 11, which are subjected to the time division multiplex transmission in bipolar signals of ±24 V as modified in the pulse width, as seen in FIG. 2. In the respective terminal units 12 and 13, on the other hand, the transmission signals received through the signal lines 14 from the central control unit 11 are rectified and smoothed for acting as their power source so that, when the address data of the received transmission signal coincide with the own specific address data of one of the terminal units, the particular terminal unit takes up the control data of this transmission signal and returns to the central control unit 11 such monitored data as monitored information of operating state of the operating switches S1-S4, operating state information of the loads L1 to L4 and so on, by rendering the signal lines 14 to be substantially in short-circuited state so as to be a current mode signal, in synchronism with the return-wait signal WT of the transmission signal.

More specifically, the central control unit 11 comprises as shown in FIG. 4 a signal processing means 20 formed by a microcomputer for carrying out such signal processing as transmission of the transmission signal Vs, reception of the return signal VB and so on, a signal amplifying means 21 for amplifying the transmission signal Vs to be ±24 V and transmitting the amplified signal onto the signal lines 14, and a return signal detecting means 22 for detecting the return signal VB returned in an electric current mode from the terminal units 12 and 13 through the signal lines 14. Further, the terminal units 12 and 13 respectively comprise as shown in FIG. 5 a signal processing means 30 formed by a microcomputer for carrying out such signal processings as reception of the transmission signal Vs, transmission of the return signal VB and so on, an address setting means 31 for setting the specific address for each terminal unit 12 or 13, a transmission signal detecting means 32 for detecting the transmission signal Vs transmitted through the signal lines 14 from the central control unit 11, and a return signal transmitting means 33 for transmitting the return signal VB in the current mode through the signal lines 14 to the central control unit 11.

In the central control unit 11, further, there is provided an interruption processing means for detecting through an interruption processing a state in which the operating switches S1 to S4 are operated, and a dummy transmission signal Vs with the mode data MD made as the dummy mode is constantly transmitted, so that, when the operating switches of any one the monitoring terminal units 12 are operated and such interruption request signal Vi as shown in FIG. 3 is transmitted from this particular terminal unit 12 in synchronism with the start pulse of the transmission signal Vs, the central control unit 11 can search for this interruption requesting terminal unit 12 to specify the same, and the thus specified interruption requesting terminal unit 12 is subjected to an access by means of the transmission signal Vs of an individual access mode so as to have the monitored data returned by means of the return signal VB in the current mode from the specified unit 12 to the central control unit 11.

Figure 6:
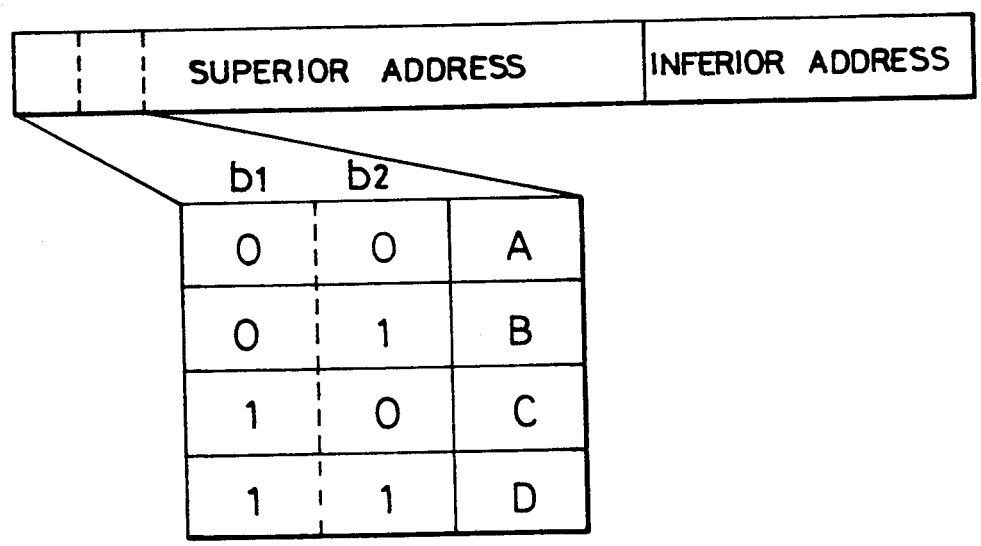
FIG. 6 is an explanatory view for the operation of the interruption processing system in the time division multiplex transmission system according to the present invention.

In FIG. 6, there is shown an embodiment of the interruption processing system in the foregoing time division multiplex transmission system. In carrying out the interruption request from one of the monitoring terminal units 12 in the present embodiment, this terminal unit 12 is to return to the central control unit 11 a signal which specifies part (for example, two bits) of the specific address of four bits, for example, in synchronism with the start pulse ST of the dummy transmission signal Vs, and the interruption request is thereby carried out. Upon receipt of this interruption request, the central control unit 11 prepares superior four bits for a group access to which, for example, four groups A to D of total sixteen monitoring terminal units 12 are to be subjected for every group in batch, by sequentially varying other bits than two bits b1 and b2 forming part of the superior four bits, carries out the group access for every group of the terminal units by transmitting a transmission signal of search mode with the superior four bits for the group access made as the address data AD to have inferior bits of the address data which are, for example, four bits returned from the interruption requesting terminal unit 12, and specifies the specific address of eight bits, for example, of the interruption requesting terminal unit 12 by compositely combining the superior and inferior bits. The thus specified interruption requesting terminal unit 12 is subjected to an access made by means of the transmission signal Vs of the individual access mode and transmitted from the central control unit 11.

Figure 7:
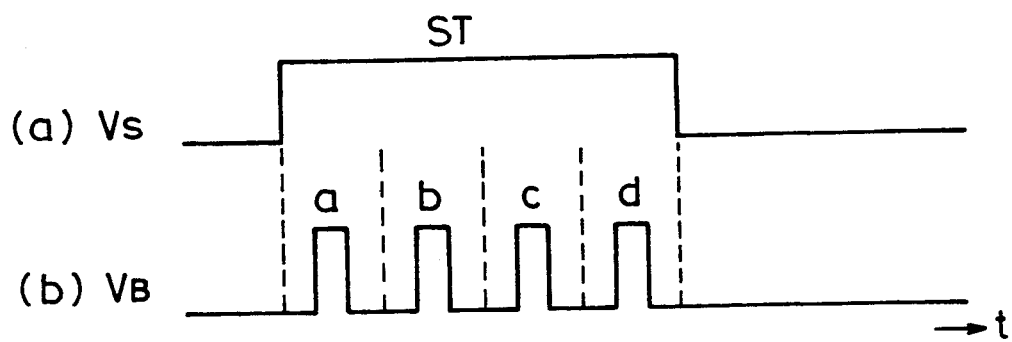
FIG. 7 is a wave form diagram for explaining the manner in which a part of bits is specified by the interruption requesting signal in the interruption processing system of FIG. 6.

More concretely, the two bits b1 and b2 forming part of the superior bits in the specific address are specified by the interruption request signal Vi in such that the interruption request signal Vi is returned with a current mode pulse signal within the start pulse ST of the dummy transmission signal Vs, four time bands "a" to "d" for returning the interruption request signal Vi are set within the start pulse ST as shown in FIG. 7, and the superior two bits of the specific address are specified depending on in which one of these time bands "a" to "d" the interruption request signal Vi is returned. Since the time bands "a" to "d" correspond respectively to each of the four groups A to D of the monitoring terminal units 12 in 1:1 relationship, the returning of the interruption request signal Vi from the monitoring terminal units 12 in, for example, the time band "c" is indicative of that this interruption request is made by one of the monitoring terminal units 12 in the group C.

According to the foregoing embodiment of FIG. 6, therefore, it is possible to limit the object of the access to one of the groups of the monitoring terminal units in which the particular interruption requesting terminal unit is possibly included, already at the stage of the reception by the central control unit 11 of the interruption request from the monitoring terminal unit 12, so that the necessity of the access to all of the groups of the terminal units as has been called for can be eliminated, and the specifying operation of the interruption requesting terminal unit 12 can be attained extremely quickly. That is, the interruption requesting terminal unit 12 can be specified only through the access to the four groups at the most, in accompanyment to which the operating state of the operating switches S1 to S4 can be rapidly grasped so as to be able to shorten required time until the corresponding loads L1 to L4 are controlled. In other words, the required responsive operation time of the entire system can be remarkably shortened.

In the embodiment referred to with reference to FIGS. 6 and 7, the number of the time bands for returning the interruption request signal can be properly reduced in accordance with the number of the terminal units 12 and 13 if the total number of the terminal units 12 and 13 is small, and the length of the start pulse can be properly shortened, as will be readily appreciated.

Referring now to FIG. 8, there is shown another embodiment of the interruption processing system according to the present invention, in which the interruption request signal Vi is made different in the pulse width with respect to each of the groups A to D of the terminal units, so that the signal can indicate with the pulse width each one of the groups A to D. Except for this respect, other arrangement and operation of the present embodiment are the same as those in the embodiment of FIGS. 6 and 7.

Referring to FIG. 9, there is shown still another embodiment of the present invention, in which the interruption request signal Vi is formed by two pulses the interval of which is varied so as to be indicative of each one of the terminal unit groups A to D by the different length of the pulse interval. Except for this respect, other arrangement and operation are the same as those in the foregoing embodiment of FIGS. 6 and 7.

In FIG. 10, there is shown a further embodiment of the present invention, which is a combined aspect of the both features of the foregoing embodiments of FIGS. 7 and 8. That is, in the present instance, two time bands are set for returning the interruption request signal Vi within the start pulse ST, the signal to be returned in each of the two time bands is made to be two which are different in the pulse width, and each of the four groups A to D of the terminal units is indicated by different combination from one another of the signal returning time band and the pulse width. Except for this respect, other arrangement and operation of this embodiment are the same as those in the foregoing embodiment of FIGS. 6 and 7.

It will be appreciated here that a further combination of other two embodiments than those in the case of FIG. 10 among the foregoing three embodiments is possible, or even all three embodiments can be combined into one. While the interruption request signal Vi has been referred to as representing partial bits, for example, two bits, it may be possible to have more than three bits or even all of the bits represented by the interruption request signal Vi.

A still further embodiment of the present invention is shown in FIGS. 11a and 11b, which provides an interruption processing system adapted to a case where the terminal units in the time division multiplex transmission system involve concurrently such ones of a so-called fixed length mode as ON/OFF controllers of wall switches, ON/OFF controllers of lighting/air conditioning devices and so on as well as such ones of so-called variable length mode as processors for temperature, humidity and the like analogue data, characters and the like display data. In the present instance, two types of the transmission signals are employed, one of which shown in FIG. 11a is a transmission signal FVs corresponding to the fixed length mode and comprising similar start pulse ST, mode data MD, address data AD, control data CD and return wait signal WT to those in the embodiment of FIG. 2 and additionally an end pulse EN at a stage following the return wait signal WT, the signal being arranged for generating a variable length interruption request signal VVi in synchronism with the start pulse ST and a fixed length interruption request signal FVi in synchronism with the end pulse EN; and the other of which shown in FIG. 11b is another transmission signal VVs corresponding to the variable length mode and comprising also similar start pulse ST, mode data MD, address data AD, control data CD and return wait signal WT to those in the embodiment of FIG. 2 and additionally such variable length code CC as a cablegram length code inserted at a stage in front of the control data CD. In this instance, the cablegram length code CC is to represent the data length of the control data CD right after the code CC in such that, when the cablegram length code CC is "2", then the control data CD will be 2 bytes and, when the cablegram length code CC is "100", then the control data CD will be 100 bytes. The arrangement is so made that, with respect to the transmission signal VVs corresponding to the instant variable length mode, the variable length interruption request signal VVi is generated in synchronism with the start pulse ST.

With the system of the foregoing arrangement, the interruption processing can be quickly carried out even in the transmission system in which the terminal units of the fixed length mode and of the variable length mode are present concurrently. In the present embodiment, other arrangement and operation than those described in the above are the same as those in the embodiment of FIGS. 6 and 7.

What is claimed is:

1. An interruption processing system in a time division multiplex transmission system which comprises a central control unit and a plurality of groups of terminal units each of which has a plurality of terminal units being connected commonly through a pair of signal lines to said central control unit and having a specific address set comprising superior and inferior bits for each terminal unit, for time division multiplex data transmission attained between the central control unit and the terminal units by means of transmission signals from the central control unit to the respective terminal units and of return signals including interruption request signals and information signals from any one of the terminal units to the central control unit, said transmission signals consisting of at least a start pulse, mode data, address data, control data and a return-wait signal, wherein an interruption request is carried out by causing said interruption request signal formed by at least part of said superior bits of said specific address and indicative of each said group in which said one terminal unit requesting an interruption to be returned from the interruption requesting terminal unit to said central control unit in synchronism with said start pulse of said transmission signals transmitted normally in dummy mode as so set by said mode data, the central control unit executes upon receipt of said at least part of said superior bits, with the transmission signals now transmitted in search mode as so set by the mode data, a group access to which the respective groups of the terminal units are subjected in batch with said address data including the superior bits prepared at the central control unit by adding to said bits forming the interruption request signal, varying combinations of other bits for specifying first the group including the interruption requesting terminal unit, the interruption requesting terminal unit in the group thus specified and accessed by the central control unit returns inferior bits of the specific address of the particular terminal unit to the central control unit, the central control unit which has received said inferior bits from the interruption requesting terminal unit then specifies the particular interruption requesting terminal unit on the basis of the superior and inferior bits, and the interruption requesting terminal unit thus specified is then subjected to an individual access of the central control unit, with the transmission signals now transmitted in individual access mode as so set by the mode data, to take up said control data of the transmission signals in the individual access mode and to return said information signal to the central control unit in synchronism with said return-wait signal of the transmission signal.

2. An interruption processing system according to claim 1, wherein said specifying of at least part of said superior bits is carried out by setting a plurality of time bands in a transmission period for said start pulse and respectively assigned to each of said groups of said terminal units, in each of which groups the terminal units being in common in at least the part of the superior bits, and said interruption requesting signal is returned to the central control unit in a pulse signal of an electric current mode in one of said time bands in which said interruption requesting terminal unit belongs.

3. An interruption processing system according to claim 2, in which said start pulse is decreased in the pulse length in accordance with total number of said terminal units, and said time bands set for the start pulse are likewise decreased in the number.

4. An interruption processing system according to claim 1 in which said specifying of at least part of said superior bits causes said interruption request signal to be returned from said interruption requesting terminal unit to said central control unit within a transmission period for said start pulse, by means of one of current mode pulse signals of mutually different pulse width and respectively set to each of said groups of said terminal units, in each of which groups the terminal units being in common in at least the part of the superior bits, and said one of said pulse signals being of one of said groups in which the interruption requesting terminal unit belongs.

5. An interruption processing system according to claim 2, in which said current mode pulse signal is made different in pulse width with respect to each of said groups of said terminal units.

6. An interruption processing system according to claim 1, in which said specifying of at least part of said superior bits causes said interruption request signal to be returned from said interruption requesting terminal unit to said central control unit within a transmission period for said start pulse, by means of one of current mode pulse signals of mutually different pulse interval and respectively set to each of said groups of said terminal units, in each of which groups the terminal units being in common in at least the part of the superior bits, and said one of said pulse signals being of one of said groups in which the interruption requesting terminal unit belongs.

7. An interruption processing system according to claim 2, in which said current mode pulse signal is made different in pulse interval with respect to each of said groups of said terminal units.

8. An interruption processing system according to claim 4, in which said current mode pulse signals of mutually different pulse width comprise respectively two pulse signals made different in pulse interval.

9. An interruption processing system according to claim 5, in which said current mode pulse signals of mutually different pulse width comprise respectively two pulse signals made different in pulse interval.

10. An interruption processing system according to claim 1, in which said terminal units include ones of a fixed length mode and ones of variable length mode, said transmission signal which corresponds to said fixed length mode includes at its last stage an end pulse with which said interruption request signal of said fixed length can be synchronized, and said transmission signal which corresponds to said variable length mode includes at its stage in front of a control data a variable length code, said interruption request signal of said variable length being able to be generated in synchronism with said start pulse of the respective transmission signals.

11. A method for handling interrupts in a time division multiplexed communication system having a central control unit and a plurality of remote terminals organized into a plurality of groups, comprising the steps of:
   (a) continuously polling the remote terminals with a dummy transmission signal;
   (b) generating an interrupt request signal at a remote terminal having at least some of a plurality of superior bits of the remote terminal's unique address;
   (c) generating a series of group access signals having address data determined by adding sequential variations of bits to the at least some of a plurality of superior bits received by the central control unit in the interrupt request signal to identify the remote terminal requesting an interrupt, and;
   (d) receiving, in said central control unit, updated supervisory input from said remote terminal.

12. The method for handling interrupts set forth in claim 11 wherein said step of identifying further comprises the step of:
   accessing some, but not all, of the groups of terminals in order to determine which remote terminal generated the interrupt request signal.

13. The method for handling interrupts set forth in claim 11 wherein said step of generating further comprises the step of:
   generating said interrupt request signal during a start pulse of the subsequent dummy transmission signal.

14. The method for handling interrupts set forth in claim 11 wherein said step of generating further comprises the step of:
   changing the width of a pulse representing the at least some of superior bits in accordance with the value of those bits.

15. The method for handling interrupts set forth in claim 11 wherein said step of generating further comprises the step of:
   changing the interval between pulses which represent the at least some of superior bits in accordance with the value of those bits.

16. The method for handling interrupts set forth in claim 11 wherein said step of generating further comprises the step of:
   generating a pulse having a predetermined width at a predetermined time interval in order to represent the at least some of superior bits.

* * * * *